(12) United States Patent
Bahnmüller et al.

(10) Patent No.: US 7,226,193 B2
(45) Date of Patent: Jun. 5, 2007

(54) ILLUMINATING DEVICE FOR A VEHICLE FOR REALIZING AN ASYMMETRICAL LIGHT DISTRIBUTION

(75) Inventors: Gerd Bahnmüller, Horzgerlingen (DE); Thomas Fröhlich, Reutlingen (DE); Michael Hamm, Eningen u.A. (DE); Peter Jauernig, Tiefenbronn (DE); Ernst-Olaf Rosenhahn, Bodelshausen (DE); Peter Schöttle, Stuttgart (DE); Mathias Kinzel, Reutlingen (DE); Kurt Neuffer, Stuttgart (DE)

(73) Assignee: Automotive Lighting Reutlingen GmbH (DE)

( * ) Notice: Subject to any disclaimer, the term of this patent is extended or adjusted under 35 U.S.C. 154(b) by 154 days.

(21) Appl. No.: 10/931,611

(22) Filed: Aug. 31, 2004

(65) Prior Publication Data

US 2005/0052879 A1   Mar. 10, 2005

(30) Foreign Application Priority Data

Sep. 2, 2003   (DE) .......................... 203 13 588 U

(51) Int. Cl.
*B60Q 1/00* (2006.01)
*B60Q 1/06* (2006.01)
*B60Q 1/12* (2006.01)

(52) U.S. Cl. ....................... 362/465; 362/523; 362/539

(58) Field of Classification Search ................ 362/465, 362/466, 523, 464, 467, 538, 525, 526, 539; 701/49

See application file for complete search history.

(56) References Cited

U.S. PATENT DOCUMENTS

| | | | | |
|---|---|---|---|---|
| 5,548,491 | A | * | 8/1996 | Karpen ........................ 362/510 |
| 5,567,032 | A | * | 10/1996 | Heizmann ..................... 362/37 |
| 5,645,338 | A | * | 7/1997 | Kobayashi ................... 362/466 |
| 5,931,572 | A | * | 8/1999 | Gotoh ........................ 362/466 |
| 5,975,729 | A | * | 11/1999 | Dobler et al. ................ 362/507 |
| 6,309,094 | B1 | * | 10/2001 | Woerner ...................... 362/539 |

FOREIGN PATENT DOCUMENTS

| DE | 19946350 | 3/2001 |
|---|---|---|
| DE | 20313588 | 9/2003 |

* cited by examiner

*Primary Examiner*—Sandra O'Shea
*Assistant Examiner*—James W Cranson
(74) *Attorney, Agent, or Firm*—Donald R. Boys; Central Coast Patent Agency, Inc.

(57) ABSTRACT

The present invention in various embodiments relates to an illuminating device for a vehicle, in particular a motor vehicle, for realizing an asymmetrical light distribution. The asymmetrical light distribution has a greater illumination depth on the vehicle's side of traffic than it does on the side of oncoming traffic.

13 Claims, 4 Drawing Sheets

Figure 1:
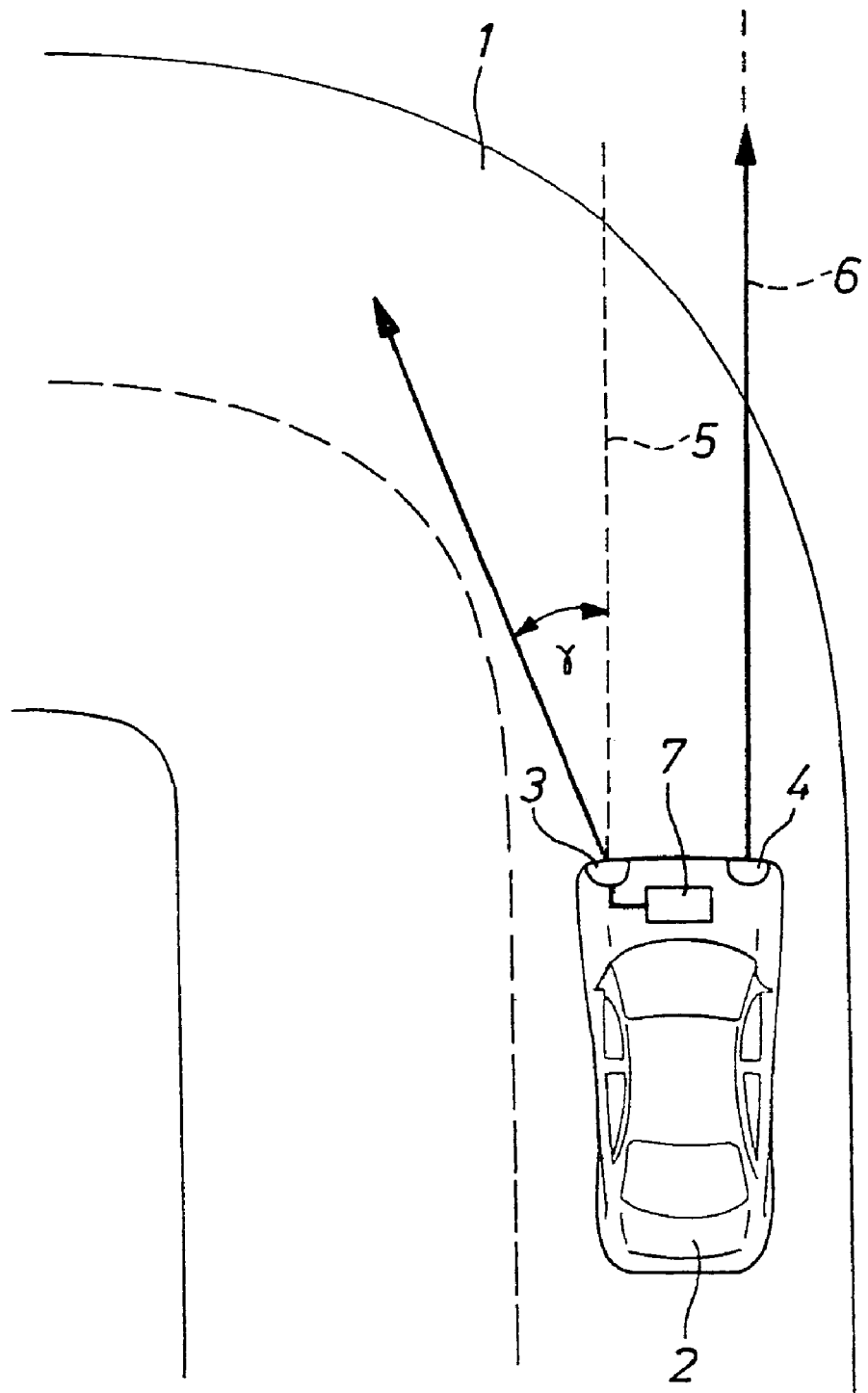

# ILLUMINATING DEVICE FOR A VEHICLE FOR REALIZING AN ASYMMETRICAL LIGHT DISTRIBUTION

CROSS REFERENCE TO RELATED DOCUMENTS

The present application discloses and claims one or more inventions taught in enabling detail in a patent application filed in Germany, Application No. 203 13 588.1, on 2 Sep. 2003; and claims priority to that prior application.

FIELD OF THE INVENTION

The present invention is in the area of illuminating devices for vehicles, and relates in particular to such devices enhanced to provide asymmetrical light distribution.

BACKGROUND OF THE INVENTION

The present invention in various embodiments relates to an illuminating device for a vehicle, in particular a motor vehicle, for realizing an asymmetrical light distribution. Asymmetrical light distribution provides greater illumination depth on the side of the road traveled on by the vehicle itself, hereinafter the vehicle's side of traffic, than on the side of the road traveled on by oncoming traffic, hereinafter the side of oncoming traffic. The illuminating device includes at least two headlights that are arranged in a forward area of the vehicle, of which at least a first headlight is arranged on the vehicle's side of traffic and at least a second headlight is arranged on the side closer to oncoming traffic.

The present invention in some embodiments also relates to a control device for controlling an illuminating device of the aforementioned type.

The illuminating device according to embodiments of the present invention can be used for both right-side driving as well as for left-side driving. In the case of right-side driving, the vehicle's side of traffic corresponds to the right-hand side of the road, and the side of oncoming traffic corresponds to the left-hand side of the road. Conversely, in the case of left-side driving, the vehicle's side of traffic corresponds to the left-hand side, and the side of oncoming traffic corresponds to the right-hand side. If, in the present application, only the right side or the left side is mentioned, statements made in connection with the side in question are also valid correspondingly for the other side.

Asymmetrical light distribution can be applied to low beam, fog light, or other similar lighting functions. In asymmetrical light distribution, the greatest proportion of the light emitted by the illuminating device is limited to an area below the light-dark boundary line. The purpose of asymmetrical light distribution is, on the one hand, to achieve the greatest possible illumination depth on the vehicle's side of traffic and, on the other hand, not to blind other road users on the side of oncoming traffic.

On a measuring screen arranged in the beam path of the illuminating device, it can be seen that, on the side of oncoming traffic, the light-dark boundary of an asymmetrical light distribution, as it is generally encountered in Europe, includes an essentially horizontal partial area, which extends roughly up to a vertical central plane that runs through the optical axis of the headlight. Proceeding from the intersection between the horizontal partial area and the vertical central plane, the light-dark boundary on the vehicle's side of traffic rises at an angle of roughly 15°.

In contrast, the light-dark boundary of the light distribution that is generally encountered in North America produces on a measuring screen horizontal partial areas both on the vehicle's side of traffic as well as on the side of oncoming traffic, the partial area of the light-dark boundary that is on the vehicle's side of traffic being arranged so as to be higher than the partial area on the side of oncoming traffic. The light-dark boundary between the two horizontal partial areas produces a diagonally rising line. Therefore, a light-dark boundary of this type represents a Z-shaped line. As a result of asymmetrical light distribution, on the roadway in front of the vehicle there is on the vehicle's side a greater illumination depth of light emitted from the illuminating device than on the side of oncoming traffic.

The asymmetrical light distribution having the light-dark boundary is generated through the cooperation of the at least two headlights of the illuminating device. In this context, the headlights of the illuminating device are not required to each produce identical light distributions, which are then superimposed to form the asymmetrical light distribution. Rather, it is quite conceivable that one of the headlights generates one specific partial area of the asymmetrical light distribution and the other headlight generates another partial area of the asymmetrical light distribution, the light-distribution partial areas generated by the individual headlights then being superimposed to create the asymmetrical light distribution of the illuminating device.

To improve the illumination of the roadway in front of the vehicle during cornering, various systems are known from the related art that make it possible to horizontally shift the direction at which light exits both headlights as a function of the radius of the curve (a so-called adaptive or dynamic cornering light system). For example, the direction at which the light exits a headlight can be shifted by swiveling a headlight module of the headlight. In these well-known dynamic cornering light systems, swivel angles are realized in a range of roughly +/−10° to +/−15°. In addition, the direction at which light exits the headlights can also be horizontally shifted as a function of the speed of the vehicle.

The advantages of cornering light systems of this type lie in increasing the recognition distance for objects on the roadway, thereby improving traffic safety. In addition, as a result of the increased depth of the light beams emitted by the illuminating device, the act of driving is less fatiguing. Furthermore, there is also greater comfort as a result of increasing the feeling of safety for the driver of the vehicle. Finally, the system also has a positive influence on driving enjoyment, because the motion of the headlights responds directly to the steering angle, i.e., to the parameters of the driving dynamics.

One disadvantage in the known system for horizontally swiveling the headlights during cornering is the expense required in adding mechanical components, bearings, and drives to the headlight. For example, a drive for horizontally swiveling the headlight or the headlight module can be configured as an electric motor, a proportional motor, a stepper motor, a piezo actuator, or even as a hydraulic or pneumatic drive. In addition, a control unit must be provided, which is connected to the headlights for shifting the direction at which light exits and which has a means for controlling the headlight module. Alternatively, a pre-existing control unit may be functionally expanded in an appropriate manner.

The suspension and support of the headlight modules that generate the headlights' asymmetrical light distribution are associated with significant expense because it is necessary both technically and functionally to arrange for the headlight modules to swivel vertically in the context of headlight leveling control and for the vertical swiveling to be superimposed on a horizontal rotational motion at a relatively large displacement angle and at a relatively great displacement speed, and to reliably guarantee this for all driving states of the vehicle. Thus, for example, requirements regarding vibration resistance no less than requirements for durability must be satisfied over a large number of swiveling cycles for the entire service life of the vehicle. Furthermore, an additional frame system must be provided for suspending and supporting the headlight modules, as well as additional drives for carrying out the horizontal swiveling. A fail-safe function must also be realized to satisfy the requirements of law in the event of failure, requiring, inter alia, sensors for monitoring the swivel position of the headlight modules. All of these additional requirements for mechanical and electrical components and for the control unit result in the illuminating devices of known cornering light systems being relatively complicated in design, cumbersome, and expensive.

An objective of the present invention, arising from the foregoing considerations, is to design and refine an illuminating device of the type cited above such that, on the one hand, during cornering the illumination depth of the light emitted by the illuminating device is increased, whereas, on the other hand, the illuminating device and its headlights are still configured in as simple, compact, and cost-effective a way as possible.

To achieve this objective, taking the illuminating device of the type indicated above as a point of departure, it is proposed that during cornering the direction of light exiting the first headlight be fixedly oriented straight ahead, irrespective of the direction and the radius of the curve, and that the direction of light exiting the second headlight be horizontally shifted at least toward the side of oncoming traffic as a function of the direction and the radius of the curve.

In embodiments of the present invention, it has been taken into account that, by asymmetrically illuminating the roadway in front of the vehicle on the basis of an asymmetrical light distribution and without additional technical efforts or measures being undertaken, the course of the roadway along a curve that bends in the direction of the vehicle's side of traffic is better illuminated than the course of the roadway along a curve that bends in the direction of oncoming traffic. As a result of the asymmetrical line of the light-dark boundary having the rising partial area on the vehicle's side of traffic, the aforementioned already applies to headlights that do not swivel horizontally. This characteristic of an illuminating device that has asymmetrical light distribution is exploited in embodiments of the present invention in that the headlight of the illuminating device arranged on the vehicle's side of traffic is configured so as not to be able to swivel. Thus the optical axis of this headlight, both in driving straight ahead as well as in cornering, is fixedly oriented straight ahead, i.e., roughly parallel to the longitudinal axis of the vehicle.

In an illuminating device according to an embodiment of the present invention, only the headlight that is arranged on the side of oncoming traffic is designed so as to be able to swivel horizontally. To achieve the deepest and best possible illumination of the roadway while cornering in the direction of the side of oncoming traffic, it is sufficient if the headlight arranged on the side of oncoming traffic can only be swiveled toward the side of oncoming traffic. It is therefore conceivable that during cornering in the direction of the vehicle's side of traffic the headlight that is arranged on the side of oncoming traffic not be swiveled but that the greater illumination depth of the emitted light on the vehicle's side of traffic due to the asymmetrical light distribution rather be exploited for more powerfully illuminating the roadway along the curve. Of course, the headlight arranged on the side of oncoming traffic may be swiveled both to the left as well as to the right so as to actively increase the illumination depth of the light emitted by the illuminating device on both left-hand and right-hand curves.

In an illuminating device according to embodiments of the present invention, only the headlight that is arranged on the side of oncoming traffic is configured so as to be able to swivel horizontally. In contrast, the headlight that is arranged on the vehicle's side of traffic is fixedly mounted on the vehicle so as not to be able to swivel horizontally. This means that the headlight on the vehicle's side of traffic can be designed in a particularly simple, compact, and cost-effective manner, since there is no need for additional mechanical and electrical components to effect horizontal movement. In addition, it is possible to simplify the control unit for controlling the horizontal swivel motion of the headlights such that the control unit is connected only to the headlight arranged on the side of oncoming traffic and such that in the control unit only one control program is provided for controlling the horizontal motion of the headlight arranged on the side of oncoming traffic. An illuminating device according to embodiments of the present invention therefore basically represents a simplification such that, in contrast to the related art, where in order to realize a dynamic cornering light function both headlights on both sides of the vehicle can be swiveled both to the right and the left, only the headlight of the illuminating device that is arranged on the side of oncoming traffic can be swiveled and only in one direction, i.e., toward the side of oncoming traffic.

According to one advantageous refinement in an embodiment of the present invention, it is proposed that the second headlight be able to be swiveled horizontally as a function of the direction and the radius of the curve both in the direction of oncoming traffic as well as in the direction of the vehicle's side of traffic.

According to one preferred embodiment of the present invention, it is proposed that the second headlight be configured as a projector beam headlight. Alternatively, it is proposed that the second headlight be configured as a reflection headlight. Usually the first headlight and the second headlight of the illuminating device are both configured either as projector beam headlights or as reflection headlights.

According to a further preferred embodiment of the present invention, it is proposed that the second headlight have a light source that is configured as an incandescent lamp, a gas discharge lamp, or a luminous area of an optical fiber. In most cases, the same type of light source is used in both the first and second headlights of the illuminating device. The advantages of the present invention in various embodiments are especially significant in illuminating devices that have incandescent lamps as light sources (so-called halogen headlights), because lower costs are specially pronounced in headlights of this type. In addition, illuminating devices of this type are used especially in smaller and less expensive vehicles, where the particularly compact headlight on the vehicle's side of traffic results in significant savings of space in the front area of the vehicle. The space that is saved can then be used for other illumination or control functions.

As a further solution to the problematic of the present invention, taking the control unit of the type cited above as a point of departure, it is proposed that the control unit have means for horizontally shifting the direction at which light exits the second headlight, the means being connected only to the second headlight and, during cornering, horizontally shifting the direction at which light exits the second headlight at least toward the side of oncoming traffic as a function of the direction and the radius of the curve, the direction at which light exits the first headlight at the same time being fixedly oriented straight ahead, irrespective of the direction and the radius of the curve.

The swiveling means are configured, for example, as a control program that runs on a computer, in particular on a microprocessor of the control unit, and that is programmed for executing a method according to an embodiment the present invention, assuming that it runs on a computer. The swiveling means are preferably stored on an electrical storage medium, for example a random-access-memory (RAM), a read-only-memory (ROM), or a flash memory. For executing the control program, it is called up from the storage medium and is transmitted to the computer either totally or partially.

According to one advantageous refinement of the present invention, it is proposed that, during cornering in the direction of the side of oncoming traffic, the swiveling means horizontally shift the direction at which light exits the second headlight in the direction of the side of oncoming traffic as a function of the direction and the radius of the curve.

According to one preferred embodiment of the present invention, it is proposed that, during cornering in the direction of the vehicle's side of traffic, the swiveling means horizontally shift the direction at which light exits the second headlight in the direction of the vehicle's side of traffic as a function of the direction and radius of the curve. Even then the second headlight does not require a fail-safe sensor.

Finally, it is proposed that the swiveling means shift the direction at which light exits the second headlight as a function of a speed of the vehicle.

Further features, potential applications, and advantages of the present invention in various embodiments will become apparent from the following description of exemplary embodiments of the present invention, which are represented in the drawing. In this context, all features that are described or represented alone or in any combination are the subject matter of the present invention regardless of their summary in the patent claims or their previous mention and regardless of their formulation or depiction in the description or the drawing.

BRIEF DESCRIPTION OF THE DRAWING FIGURES

FIG. 1 in a view from above depicts a vehicle that is furnished with an illuminating device of the present invention in accordance with a preferred embodiment, during cornering to the left.

Figure 2:
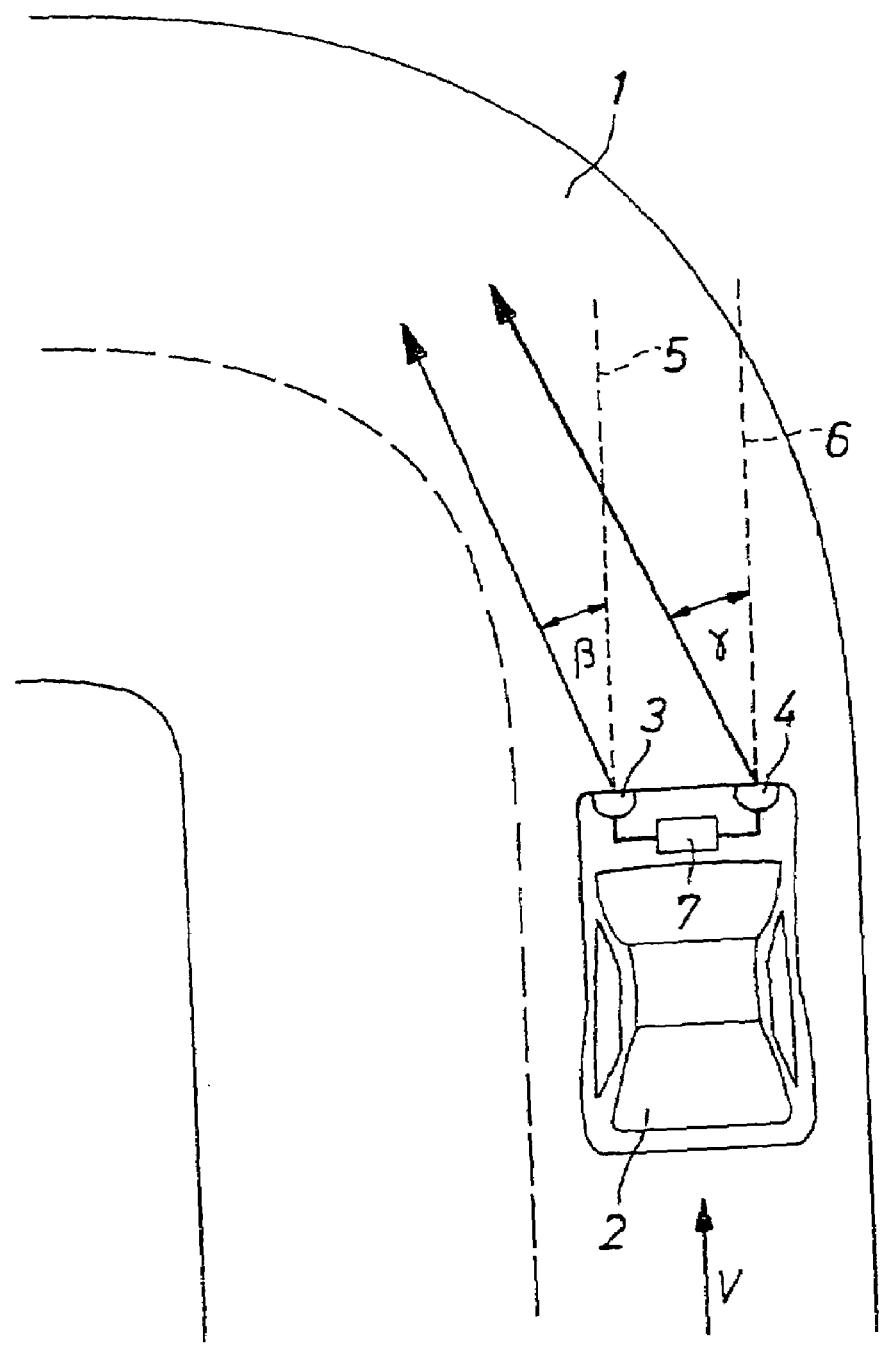

FIG. 2 in a view from above depicts a vehicle that is furnished with an illuminating device that is known from the related art, during cornering to the left.

Figure 3:
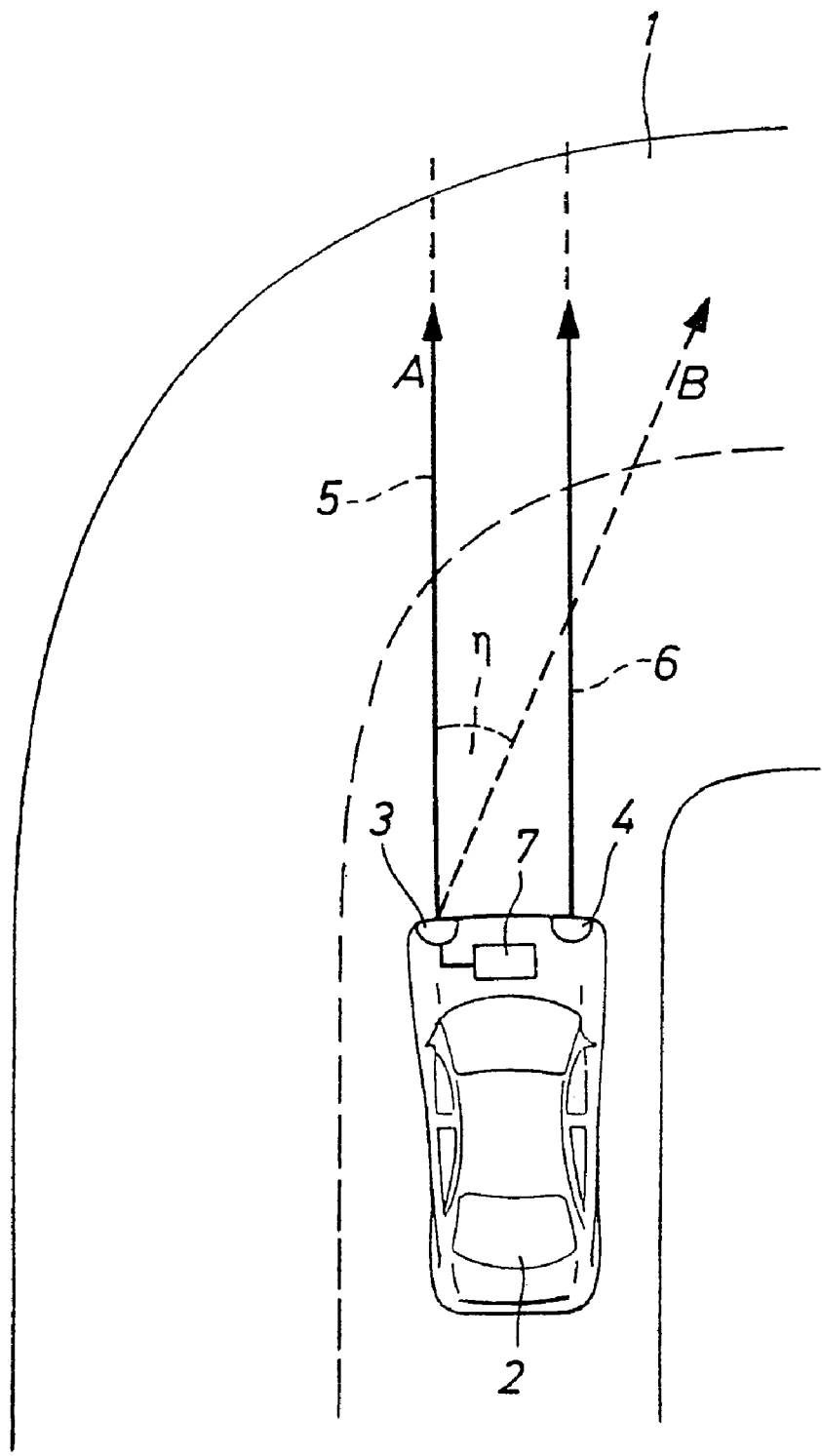

FIG. 3 in a view from above depicts the vehicle from FIG. 1 having an illuminating device according to an embodiment of the present invention, during cornering to the right.

Figure 4:
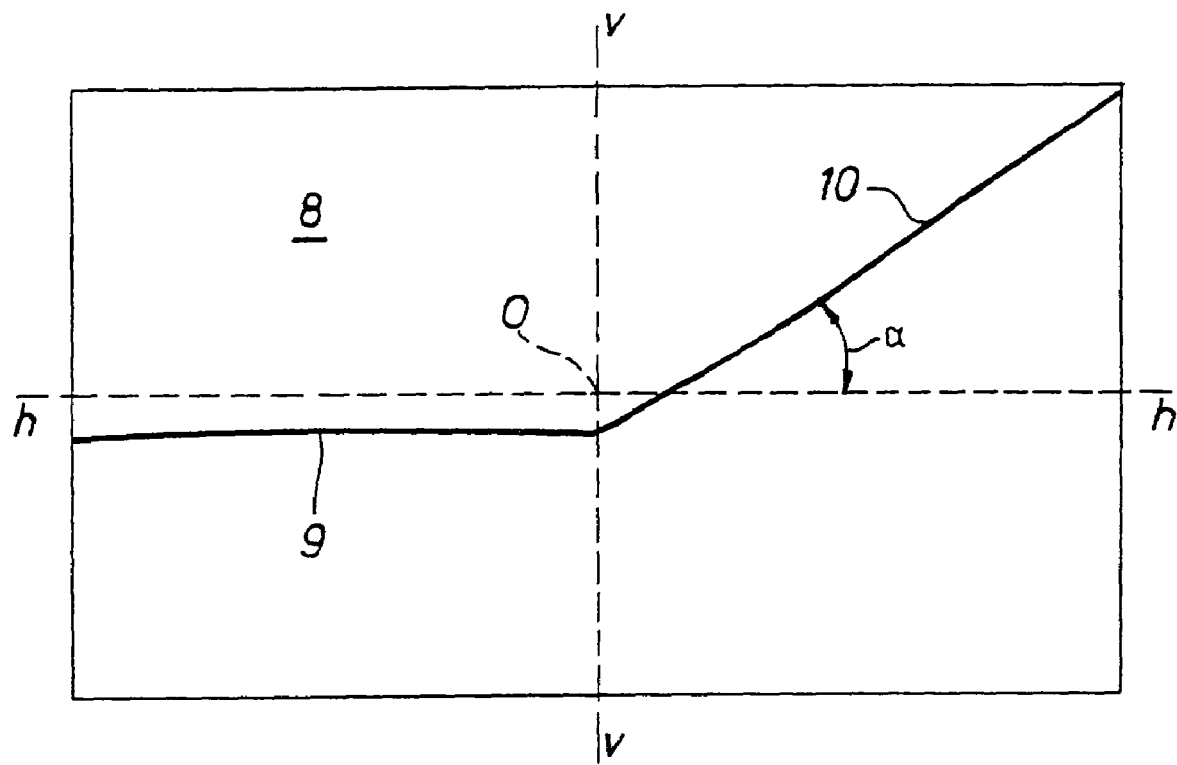

FIG. 4 depicts an asymmetrical light distribution that is represented on a measuring screen arranged in the beam path of the illuminating device.

DESCRIPTION OF THE PREFERRED EMBODIMENTS

The Figures and the corresponding description of the Figures in this document relate to right-hand driving, but they can also apply correspondingly to illuminating devices in left-hand-driving vehicles.

In FIG. 2, a street is depicted, in right-hand lane 1 of which a motor vehicle 2 is cornering to the left. In the front area of vehicle 2, two headlights 3, 4 are arranged, one headlight 3 being arranged on the left side, i.e., on the side of oncoming traffic, and the other headlight 4 being arranged on the right side, i.e., on the vehicle's side of traffic. Emerging from headlights 3, 4 and extending approximately straight ahead are dotted lines 5, 6 which represent the direction at which light exits headlights 3, 4 during driving on a straight roadway 1. Vehicle 2 is equipped with a dynamic cornering light system that is known from the related art, in which during cornering both headlights 3, 4 are swiveled horizontally.

The swiveling of the light exit direction is accomplished by control unit 7 as a function of the direction and the radius of the curve and, under certain circumstances, of other parameters such as speed V of vehicle 2. In the left-hand curve depicted, the direction at which light exits headlight 3 is shifted to the left about an angle $\beta$. The direction at which light exits headlight 4 is shifted to the left about an angle $\gamma$. Angles $\beta$ and $\gamma$ do not necessarily have to be identical. However, for purposes of illustrating the controlling of the horizontal shift in the direction at which light exits headlights 3, 4, angles $\beta$ and $\gamma$ are depicted as identical.

Headlights 3, 4 can be configured as projector beam headlights, in which a light source emits light that is reflected by a reflector, preferably an ellipsoidal reflector, and that is projected by a projection lens onto roadway 1 in front of motor vehicle 2. Between the reflector and the lens an aperture is arranged whose upper edge is projected onto roadway 1 as the light-dark boundary of an asymmetrical light distribution. Asymmetrical light distribution will be explained in greater detail below on the basis of FIG. 4.

Alternatively, headlights 3, 4 can also be configured as reflection headlights, in which light beams emitted by the light source are reflected by a reflector onto roadway 1 in front of motor vehicle 2. In the path of the light beams that are reflected by the reflector, it is possible to arrange a light disk having an optically active element (e.g., a prism), which, acting together with the shape of the reflector, generates the asymmetrical light distribution on roadway 1 in front of motor vehicle 2. However, the light disk can also be configured without optically active elements, as a so-called clear glass disk, the asymmetrical light distribution then being generated only by the shape of the reflector, perhaps with the additional influence of a cap that is arranged in front of the light source. The light source of headlights 3, 4 can be configured as an incandescent lamp (e.g., a halogen lamp), a gas discharge lamp, one or more semiconductor light sources (LED), or one or more luminous areas of a photoconductor.

Shifting the direction at which light exits headlights 3, 4 can be accomplished in a number of ways. It is conceivable to horizontally swivel the entire headlight 3, 4. Alternatively, it is also possible to swivel only one part of headlight 3, 4, for example, a headlight module. In the case of projector beam headlights, it is conceivable to move the projection lens relative to the reflector so as to shift the light exiting direction horizontally. Both in the case of reflection headlights as well as in the case of projector beam headlights, it is conceivable to move a light disk that is provided with optically active elements relative to the reflector in order to horizontally shift the direction at which light exits headlights 3, 4. Many other possibilities for swiveling headlights 3, 4 are also conceivable.

Headlights 3, 4 generate an asymmetrical light distribution, which in FIG. 4 can be seen as projected on a measuring screen 8 that has been arranged in the beam path of the illuminating device. On measuring screen 8 an imaginary horizontal axis hh and a likewise imaginary vertical axis vv are provided. Intersection point 0 of the two axes is the optical axis of headlights 3, 4. The asymmetrical light distribution is limited in the upward direction by an asymmetrical light-dark boundary. The light-dark boundary includes a partial segment 9 that runs basically horizontally and that is situated on the side of oncoming traffic, the partial segment extending to a vertical central plane that includes the optical axis and runs through vertical axis vv. Proceeding from partial segment 9 of the light-dark boundary, the latter rises in a partial segment 10 toward the vehicle's side of traffic at an angle $\alpha$ of roughly 15°. The asymmetrical light distribution produces greater illumination depth on the vehicle's side of traffic than on the side of oncoming traffic. As a result, under conditions of limited visibility, the visibility on the vehicle's side of traffic is increased without blinding oncoming traffic participants.

In the illuminating device known from the related art, in accordance with FIG. 2, it is disadvantageous that, in order to achieve the horizontal swiveling capacity of both headlights 3, 4, it is necessary to undertake significant mechanical and electrical expenditures.

In contrast, in the illuminating device according to an embodiment of the present invention as shown in FIGS. 1 to 3, headlights 3, 4 are not both configured so as to be capable of swiveling horizontally. Rather, the direction at which light exits headlight 4, which is arranged on the right side of the roadway, is fixedly oriented straight ahead (see reference numeral 6) regardless of the direction and the radius of cornering. Only the direction at which light exits second headlight 3 can be shifted horizontally about an angle indicated in the drawing as lower-case Greek letter delta, between the arrowed solid line indicating the direction of illumination of headlight 3 and the straight-on dotted line 5. In FIG. 1, vehicle 2 is depicted as cornering to the left in right-hand driving. It can clearly be seen how only the direction at which light exits left headlight 3 is shifted horizontally about angle delta, whereas the direction at which light exits right headlight 4 is fixedly oriented straight ahead and overlaps dotted line 6. Thus the direction at which light exits right headlight 4 during cornering is identical to its direction during straight ahead driving.

In FIG. 1, it can clearly be seen that control device 7 is connected only to headlight 3, which is arranged on the side of oncoming traffic. There is no connection to headlight 4, which is arranged on the vehicle's side of traffic, at least with regard to swiveling in the context of the illuminating device according to an embodiment of the present invention. The illumination control devices, e.g., for headlight leveling control, generally have a lateral communication capability between headlights 3 and 4.

In this way, the illuminating device according to an embodiment of the present invention offers a significant reduction in the quantity of required components, since in first headlight 4 it is possible to do without a supplemental support frame for horizontally shifting headlight 4, an activation means for swiveling the headlight horizontally, and a means in control device 7 for controlling headlight 4 to generate horizontal swiveling. Overall, the result is an illuminating device in which headlight 4, which is arranged on the vehicle's side of traffic, is configured in a particularly simple, compact, and cost-effective manner. In addition, it is possible to realize corresponding simplifications in control device 7.

In FIG. 3, the vehicle having the illuminating device according to an embodiment of the present invention is depicted while cornering to the right in right-hand driving. Two exemplary embodiments A, B are depicted, in both of which the direction at which light exits first headlight 4 is fixedly oriented straight ahead, irrespective of the direction and the radius of the cornering (see reference numeral 6).

In exemplary embodiment A, the direction at which light exits second headlight 3 is also fixedly oriented straight ahead (see reference numeral 5). This means therefore that in exemplary embodiment A the direction at which light exits second headlight 3 can be shifted about angle $\beta$ only toward the side of oncoming traffic (in the case of right-hand driving, therefore, to the left). Headlight 3 is thus only swiveled horizontally to the left during cornering to the left. During cornering to the right, headlight 3 is not swiveled, but rather remains oriented straight ahead.

On the other hand, in exemplary embodiment B, the direction at which light exits second headlight 3 is swiveled horizontally about an angle $\eta$ toward the vehicle's side of traffic. In exemplary embodiment B, the direction at which light exits second headlight 3 can therefore be shifted both toward the side of oncoming traffic (while cornering in the direction of the side of oncoming traffic) as well as toward the vehicle's side of traffic (when cornering in the direction of the vehicle's side of traffic). In exemplary embodiment B, as a result of the asymmetrical light distribution, the greater illumination depth of right headlight 4 on the vehicle's side of traffic is supported by left headlight 3, which is capable of swiveling, so as to achieve a deeper and therefore better illumination of roadway 1 during cornering in the direction of the vehicle's side of traffic.

One important aspect in some embodiments of the present invention is to retain the positive features of a dynamic cornering light function while at the same time configuring the illuminating device in an essentially simpler, more compact, and more cost-effective manner. In addition, as a result of the simplified configuration of control unit 7, which here is called upon to control only one single headlight 3, further simplification and cost optimization can be achieved. In comprehensive trials, it has been proven that only a relatively small increase in the illumination depth of the light beams emitted by headlights 3, 4 can be achieved by shifting the direction at which light exits headlights 3, 4 during cornering to the right. In contrast, during cornering to the left, for example, in a cornering radius of 250 m, an increase in the illumination depth of approximately 35% was obtained. In other words, for increasing the safety and the subjective feeling of safety of the driver, it is substantially more effective to horizontally swivel headlight 3 to the left than to the right, headlight 3 being arranged on the side of oncoming traffic.

The improvement in illumination depth during cornering to the left is achieved by horizontally shifting light-dark boundary 9, 10. This effect is essentially dominated by left headlight 3. Therefore, during cornering to the left, a one-sided swiveling of left headlight 3 supplies the majority of the increased illumination depth.

The illuminating device according to an embodiment of the present invention is therefore configured such that horizontal swiveling is realized only with respect to left headlight 3. Headlight 4 on the right side is configured in the conventional manner (without a cornering light function). As a result, on the right side, the expense for the support frame system, the drive, the fail-safe sensor, and the swiveling means in control device 7 is saved in comparison to the known cornering light systems. A further advantage is the saving in installation space, which can be exploited for other illumination functions (for example, an adaptive light or spotlight) or other vehicle functions. Furthermore, headlight 3 on the left side does not have to be equipped with the capacity to swivel to the right, because this only offers a relatively insignificant advantage.

In the illuminating device according to an embodiment the present invention, the advantages of the dynamic cornering light are substantially retained, but the effort and expense of realizing the illuminating device are substantially reduced. Control device 7 for driving the illuminating device via the means for horizontally shifting the direction at which light exits headlights 3, 4 is preferably accommodated in the interior of vehicle 2. Control device 7 can also be designed so as to be less expensive because one driver for controlling right headlight 4 as well as further hardware and software elements (for example, plug-in pins, a control program for swiveling headlight 4) can be eliminated. In addition, there is less cabling expense in the extension to headlight 4, which is arranged on the right side.

The illuminating device according to an embodiment of the present invention is especially recommended when headlights 3,4 are used that employ incandescent lamps as a light source, since in this case the extra price for a cornering light system plays a far more important role than in illuminating devices having headlights 3, 4 that operate using more cumbersome and expensive light sources. The illuminating device according to an embodiment of the present invention is especially suited for vehicles 2 of the medium and compact classes, because, in these vehicle classes, the costs for a cornering light system have greater significance than in the case of the upper classes.

What is claimed is:

1. An illuminating device for a vehicle (2), in particular a motor vehicle, for providing an asymmetrical light distribution that has a greater illumination depth on the vehicle's side of traffic than on the side of oncoming traffic, by means of at least two headlights (3, 4) that are arranged in a forward area of the vehicle (2), of which at least a first headlight (4) is arranged on the vehicle's side of traffic and at least a second headlight (3) is arranged on the side of oncoming traffic, wherein the illuminating device has means for horizontally shifting the direction at which light exits the second headlight (3), the means being connected only to the second headlight (3), and when the vehicle (2) corners, the direction at which light exits the second headlight (3) is horizontally swiveled at least in the direction of the oncoming traffic as a function of the direction and the radius of the curve, and simultaneously the direction at which light exits the first headlight (4) is fixedly oriented straight ahead (6) irrespective of the direction and the radius of the curve.

2. The illuminating device as recited in claim 1, wherein the second headlight (3) can be horizontally swiveled as a function of the direction and the radius of the curve both in the direction of the oncoming traffic as well as in the direction of the vehicle's side of traffic.

3. The illuminating device as recited in claim 1, wherein the second headlight (3) is configured as a projector beam headlight.

4. The illuminating device as recited in claim 1, wherein the second headlight (3) is configured as a reflection headlight.

5. The illuminating device as recited in claim 1 wherein the second headlight (3) has a light source that is configured as an incandescent lamp, a gas discharge lamp, or a luminous area of an optical fiber.

6. A control device (7) for driving an illuminating device for a vehicle (2), especially for a motor vehicle, the illuminating device generating an asymmetrical light distribution, which has a greater illumination depth on the vehicle's side of traffic than on the side of oncoming traffic, by means of at least two headlights (3, 4) that arranged in a forward area of the vehicle (2), of which at least a first headlight (4) is arranged on the vehicle's side of traffic and at least a second headlight (3) is arranged on the side of oncoming traffic, wherein the control unit (7) has means for horizontally shifting the direction at which light exits the second headlight (3), the means being connected only to the second headlight (3) and, when the vehicle (2) corners, the direction at which light exits the second headlight (3) is horizontally swiveled at least in the direction of the oncoming traffic as a function of the direction and the radius of the curve, and at the same time the direction at which light exits the first headlight (4) is fixedly oriented straight ahead, irrespective of the direction and the radius of the curve.

7. The control device (7) as recited in claim 6, wherein, as the vehicle (2) corners in the direction of the oncoming traffic, the swiveling means horizontally shifts the direction at which light exits the second headlight (3) toward the oncoming traffic as a function of the direction and the radius of the curve.

8. The control device (7) as recited in claim 6, wherein, as the vehicle (2) corners in the direction of the vehicle's side of traffic, the swiveling means horizontally shifts the direction at which light exits the second headlight (3) toward the vehicle's side of traffic as a function of the direction and the radius of the curve.

9. The control device (7) as recited in claim 6 wherein the swiveling means shifts the direction at which light exits the second headlight (3) as a function of a speed of the vehicle (2).

10. The illuminating device as recited in claim 2, wherein the second headlight (3) is configured as a projector beam headlight.

11. The illuminating device as recited in claim 2, wherein the second headlight (3) is configured as a reflection headlight.

12. The illuminating device as recited in claim 2 wherein the second headlight (3) has a light source that is configured as an incandescent lamp, a gas discharge lamp, or a luminous area of an optical fiber.

13. The control device (7) as recited in claim 7, wherein, as the vehicle (2) corners in the direction of the vehicle's side of traffic, the swiveling means horizontally shifts the direction at which light exits the second headlight (3) toward the vehicle's side of traffic as a function of the direction and the radius of the curve.

* * * * *